United States Patent [19]

Langerbeins et al.

[11] Patent Number: 5,061,518
[45] Date of Patent: Oct. 29, 1991

[54] ACRYLIC PROTECTIVE COATINGS

[75] Inventors: Klaus Langerbeins, Langen; Hans Trabitzsch; Helmut Daum, both of Seeheim-Jugenheim, all of Fed. Rep. of Germany

[73] Assignee: Röhm GmbH, Darmstadt, Fed. Rep. of Germany

[21] Appl. No.: 437,537

[22] Filed: Nov. 16, 1989

[30] Foreign Application Priority Data

Nov. 19, 1988 [DE] Fed. Rep. of Germany ....... 3839177

[51] Int. Cl.$^5$ .............................................. B65B 33/00
[52] U.S. Cl. .................................... 427/154; 427/156; 427/340; 427/341; 427/352; 427/353; 427/385.5; 427/388.1
[58] Field of Search ...................... 427/156, 154, 385.5, 427/341, 340, 352, 353, 388.1

[56] References Cited

U.S. PATENT DOCUMENTS

| | | | |
|---|---|---|---|
| 3,544,349 | 12/1970 | Isaksen et al. | 427/156 |
| 4,200,671 | 4/1980 | Krajewski et al. | 427/156 |
| 4,476,269 | 10/1984 | Wilk et al. | 524/297 |
| 4,612,058 | 9/1986 | Geke et al. | 427/156 |
| 4,917,926 | 4/1990 | Weinhold et al. | 427/154 |

FOREIGN PATENT DOCUMENTS

| | | |
|---|---|---|
| 0082931 | 7/1983 | European Pat. Off. . |
| 0015694 | 8/1984 | European Pat. Off. . |
| 0124849 | 6/1988 | European Pat. Off. . |

OTHER PUBLICATIONS

R. H. Perry, "*Perry's Chemical Engineer's Handbook*", McGraw-Hill, N.Y., 1984, pp. 26-28, 26-29, TP155P4.
Chemical Abstracts, 94, 3235d.

*Primary Examiner*—Janyce Bell

[57] ABSTRACT

Methods for providing temporary protective coatings on mechanic objects by applying thereto an aqueous emulsion of a lipophilic poly(meth)acrylate polymer predominately including esters of alcohols having at least four carbon atoms and then removing said temporary coatings when desired with an organic solvent which, with the polymer dissolved therein, is conveniently disposed of by combustion.

3 Claims, No Drawing Sheets

ACRYLIC PROTECTIVE COATINGS

The present invention relates to temporary protective coatings for mechanical objects and pertains in particular to such protective coatings for which the method of their application together with the method of their removal minimize environmental pollution.

For temporary protective coatings there is the requirement that they must be easily removable as soon as they have fulfilled their function. They are used for temporary surface protection of mechanical objects which are mostly of metallic or synthetic resin materials. The protection can be one against weathering; it can however also be protection against mechanical attack, e.g. in the further processing of manufactured articles.

The best known example is the preservation of auto bodies for transport and for their outdoor storage, for which coatings of waxes are usually applied. These are mostly applied in the form of solutions or emulsions in, for example, organic solvents, whereby the solvents evaporate and must again be separated from the exhaust air with great technical effort. Also, in this case, removal of the preservative is best carried out by washing, again with organic solvents or aqueous emulsions, whereafter the solutions, optionally after mechanical separation of the water phase, are most simply led to combustion plants for the generation of heat energy.

The mechanical and thermal properties of wax protective coatings are insufficient for many uses. Thus, there has been no lack of efforts to produce removable protective coatings having properties improved with respect to those of wax layers. Above all, the proposals concern synthetic polymers which are suitable for film forming. Inter alia, acrylate polymers, which are advantageously used as aqueous polymer dispersions for the formation of the protective layer, are adaptable as film formers. In order also to effect removal of the protective layer with aqueous systems, protective coatings of copolymers comprising acrylates which contain comonomers containing groups capable of salt formation and which can be removed with aqueous systems, e.g. by treatment with aqueous alkali, are proposed in EP-B 0,082,931 and EP-A 0,115,694.

The problem with this method is the treatment of the waste water arising from removal of the preservative coating. The polymers dissolved therein are not biologically decomposable and cannot be removed from the water in a conventional purification plant. Only in additional operations, such as acidification, precipitation as difficulty soluble metal salts of, for example, calcium or aluminum or iron, and by sludge removal, can the polymer be separated from the water, whereby the latter is again contaminated with other materials.

Treatment of the aqueous alkalies used for removal known from EP-B 0,124,849, with their content of difficultly decomposable organic additives necessary for removal of the preservative, is also practically in the same category as the aforementioned process.

According to Japanese patent 80 115 745 (cf. Chem. Abstr. 94 32357d), a protective layer prepared from an organic solution is removed by treatment with gasoline. This kind of protective layer preparation is again burdened with the disadvantages already described above.

To comply with the demand for an improved removal of the material arising in the use of temporary polyacrylate protective coatings, such as dispersion media, solvents, and the spent polymer of the protective layer, it has been found according to the present invention that temporary protective coatings which are formed from aqueous dispersions of acrylic polymers, and which can, when needed, again be removed by treatment with combustible organic solvents, bring a diminution of the environmental pollution involved in working with temporary protective coatings.

Thus, the invention relates to temporary protective coatings of acrylic polymers wherein the acrylic polymer protective layer is formed on the body to be protected from an aqueous dispersion of acrylic polymers and this layer is removed when needed by treatment with combustible organic solvent.

Acrylic polymers which meet these combined requirements are copolymers of esters of acrylic acid and/or esters of methacrylic acid. It has been found that, above all, copolymers having a relatively high content of monomers of (meth)acrylic acid esters having at least four carbon atoms in the ester portion are suitable for use according to the invention.

The copolymers which are the basis of the protective coatings of the invention are film forming at temperatures up to 0° C. and have a glass transition temperature $T_g$ of 0° C., or greater than 0° C., for example 10° C.–15° C. They are weather resistant, i.e. they are insoluble in (rain) water and remain stable at temperatures of about 60° C. to 80° C., in contrast to the temperature sensitive wax coatings. The synthesis of the copolymers from monomers, i.e. particularly from esters of methacrylic acid which per se have a high solubility in hydrocarbon solvents, for example hexane, implies that the protective layer can be removed after fulfillment of its function by treatment with combustible organic solvents, for example can be dissolved with hydrocarbons, and that such a solution can then be led to a combustion plant in order to keep environmental pollution as small as possible by way of such removal.

The preservation and reconstitution of mechanical objects such as automobiles with the temporary coatings of the invention can take place in conventional facilities. On application of the aqueous dispersion and film formation with it, only water, in liquid and vapor form, is removed. On removal of the preservative, the organic solvent or the organic solution containing the copolymer, optionally together with water, can be recirculated until its capacity for cleaning clearly diminishes. The possibly present aqueous phase, which can be from 50 to 95 percent by weight of the removal medium, is separated from the organic phase prior to combustion. In this disposal, the polymers, which consist practically of the elements C, H, and O and as such are combustible, are decomposed with the solvent to the combustion products $CO_2$ and $H_2O$; this treatment in a heat recovery unit leads to no additional pollution of the atmosphere.

The acrylic polymers to be used according to the invention are applied for film formation in aqueous dispersion to the objects to be protected and are thus preferably prepared as aqueous emulsion polymers and are used in this form for preservation. The polymers are advantageously emulsion polymers or copolymers essentially of esters of acrylic acid and/or esters of methacrylic acid which provide a required lipophilicity of the protective layer corresponding to its characteristics for removal. The hydrophobically adjusted polymer can, however, also contain small amounts of less lipophilic, indeed even pronounced hydrophilic monomers, as components. Such hydrophilic monomers are, for example, polymerizable carboxylic acids such as acrylic acid, methacrylic acid, maleic acid or its anhydride, itaconic acid (or its anhydride), or monomers having basic groups such as N-dimethylaminoethyl methacrylate, N-[3-(dimethylamino)-2,2-dimethylpropyl]methacrylamide, or monomers having hydrophilic alcohols in the ester portions, for example 2-[2-(2-ethoxyethoxy)ethoxy]ethyl methacrylate. They are present in the polymer in amounts less than 10, and preferably less than 5, percent by weight, to 0.5 or 0 percent by weight. The inclusion of such polar monomers in small amounts has a positive effect on the stability of the polymer dispersion in that it combats clumping. The long-time stability attained in this way is important for shipment and storage of the acrylic polymer dispersions required for temporary protective coatings according to the invention.

The lipophilic portion is predominantly or exclusively esters of acrylic acid or of methacrylic acid. In addition, however, still other comonomers may be used in such amounts that the desired proportions of the polymer, such as the desired mechanical properties and the solution or dissolution properties desired for removal according to the invention, are retained.

In the first instance, esters of acrylic acid or of methacrylic acid having at least four carbon atoms in the alcohol portion of the ester group, for example $C_4$- to $C_{24}$-alcohols, are particularly suitable for preparation of the protective coatings of the present invention. The esters can be derived from linear or branched alkyl alcohols, but also from alcohols of saturated cyclic hydrocarbons having at least 5 or 6 carbon atoms and which may be further alkyl substituted. Also, higher (meth)acrylic esters, which are prepared from industrial mixtures of alcohols, e.g. a $C_{10}$- to $C_{20}$-alcohol mixture having an average C-number of 16.2 to 17.2, are advantageously useful as monomers for the preparation of the temporary protective coatings of the invention. Further, acrylate and methacrylate esters have aromatic groups in the alcohol portions are useful as lipophilic monomers. However, for economical and ecological reasons, their use in the invention is considered of only a limited scope.

Acrylate and methacrylate esters which are derived from alcohols having fewer than four carbon atoms in the ester portion are also useful as comonomers, but it is necessary to pay attention that particularly the amount of the corresponding methacrylate esters, above all of methyl methacrylate, should not be too large, i.e. as a rule not in excess of 40 to 50 percent by weight, calculated on the total polymer. These copolymerized monomers could otherwise, on the one hand, give a too high glass temperature and therewith an undesired brittleness of the coating or, on the other hand, an insufficient solubility or removability of the coating with organic solvents such as hydrocarbons like hexane or gasoline.

The acrylic polymer is essentially, i.e. from 70 to 100, preferably from 80 to 90, and particularly from 90 to 98 percent by weight composed of esters of acrylic acid and/or methacrylic acid, with predominantly, i.e. from 51 to 100, preferably from 60 to 90, and particularly from 70 to 98 percent by weight of (meth)acrylic esters of alcohols having at least four carbon atoms. In addition to the acrylic or methacrylic compounds, further $\alpha,\beta$-unsaturated compounds such as styrene, $\alpha$-methylstyrene, or vinyl acetate can be included as comonomers in the emulsion polymer and thus be included in the temporary protective coating. In general, their amount is then from 0 or 0.5 percent by weight to 30 percent by weight, preferably from 0 or 0.5 to 10 percent by weight.

As acrylate and methacrylate esters for the preparation of the acrylate polymer protective layer, the following are used, for example: ethyl acrylate, isopropyl acrylate, methyl methacrylate, ethyl methacrylate, and above all those esters with alcohol portions having at least four carbon atoms such as n-butyl acrylate, isobutyl acrylate, n-butyl methacrylate, isobutyl methacrylate, n-hexyl methacrylate, 2-ethylhexyl acrylate, 2-ethylhexyl methacrylate, n-dodecyl methacrylate, $C_{16.2}$-$C_{17.2}$-methacrylate esters (e.g. "Stenol 1220P", a fatty alcohol of the Dehydag firm), cyclohexyl methacrylate, or 3,3,5-trimethylcyclohexyl methacrylate.

Protective layers according to the invention are formed from aqueous dispersions of acrylic polymers. Thus, the aqueous acrylic polymer dispersions are most advantageously prepared by polymerization of the monomers suited therefor in aqueous emulsion, in part also in suspension, respectively according to known methods (cf. on this point H. Rauch-Puntigam, Th. Völker, *Acryl- und Methacrylverbindungen* ("Acrylic and Methacrylic Compounds"), pages 217 to 228, Springer-Verlag, Heidelberg 1967 and *Ullmann's Encyclopadie der technischen Chemie* ("Ullmann's Encyclopedia of Technical Chemistry"), 4th edition, Volume 19, pages 11 to 14 and 125 to 141, Verlag Chemie 1980.

The emulsion polymerization is carried out with the universally common non-ionic, cationic, and anionic emulsifiers known therefor, such as e.g. the alkali metal and ammonium salts of sulfated fatty alcohols, aromatic sulfonic acids, or sulfated ethylene oxide adducts.

Suitable anionic emulsifiers are, for example, sulfated oxyethylated alkylphenols neutralized with alkali, which can be prepared, for example, from nonylphenol- or triisobutylphenol adducts having 3 to 30 ethylene oxide units per molecule.

Polymerization can proceed according to the batch process or to an addition process such as the monomer-addition or the emulsion-addition method. The emulsion-addition process is used to special advantage. In this process, only a portion of the water phase, as a rule 10 to 70 percent of the total, is introduced into the polymerization vessel. The monomer phase is emulsified in the remaining portion of the water phase, which as a rule contains a portion of the emulsifying agent, under conditions under which still n polymerization occurs, and the resulting emulsion is gradually introduced into the reaction vessel where polymerization conditions prevail.

The methods can be modified in manifold ways. Thus, for example, the initiator or a portion of the emulsifying agent can be gradually added or introduced in portions, separate from the monomer phase. As a polymerization initiator, mostly an alkali metal or ammonium persulfate is used, but also other, preferably water soluble, initiators such as 4,4'-azobis-4,4'-dicyanovalerianic acid, or redox systems such as persulfates, sulfoxy compounds, and iron salts or hydrogen peroxide and iron-II-salts, can be used instead of or in addition thereto. The latter are added separately from the monomer phase, since they already initiate polymerization at room temperature. The reaction temperature is coordinated with the decomposition temperature of the initiator and generally is between 10° C. and 100° C.

The polymer concentration in the dispersions is in the range of about 30 to 70 percent by weight of solids at preparation and the viscosities of the polymer dispersions are generally in the range from 10 to 5000 mPa.s (ISO 2555).

The particle size of the emulsion polymer is advantageously in the range from 20 to 600 nanometers (nm), preferably in the range from 50 to 400 nm. (Determination by photon correlation spectroscopy, also known as autocorrelation spectroscopy, using the "Nano-Sizer" of Coulter Electronics, Ltd., Luton, Beds.).

As a rule the polymers have a minimum film forming temperature (MFT) in the range from 0° C. to about 30° C., for example from about 0° C. to 20° C. (*Ullmann's Encyklopadie der technischen Chemie,* 4th edition, Volume 19, pages 17, 18, and 141; DIN 53787).

For preservation, the aqueous polymer dispersion is applied to the object to be protected. For this, polymer dispersions, which are prepared as such, are advantageously used, optionally after dilution with water.

The application of the coating can be carried out according to methods now in use, such as by dipping, by spraying with a hand-directed spray gun, or also by machine as is usual, for example, in the preservation of auto bodies. By passing the coated parts through a drying tunnel, they can quickly be freed of adherent water. The drying can be carried out and accelerated at temperatures from about 20° C. to about 80° C., or at even somewhat higher temperatures, advantageously in the presence of an accompanying gas, particularly with air.

Removal of the preservative layer is carried out according to the invention with a combustible solvent or solvent mixture in which the acrylic polymer protective layer should be adequately soluble or well soluble. The solvent (mixture) can be diluted by emulsification in water. Acrylic polymers, as described above and which are essentially prepared from (meth)acrylate esters of alcohols having at least four carbon atoms in the ester portion, are highly soluble in common solvents such as carboxylic acid esters—for example acetic acid esters—or in hydrocarbons such as hexane or other hydrocarbons, and also in mixtures of these, such as gasoline. These introduced solvents, as well as the acrylic polymers dissolved or partly dissolved therein after removal of the protective layers, are completely combustible to $CO_2$ and $H_2O$ in a combustion apparatus. Hydrocarbons containing halogen or, for example, nitro groups are not used as solvents, because they cannot be simply disposed of in an environmentally-sound way. Solvents which contain no or only small amounts of aromatics, predominantly consist of the elements C and H and optionally further can contain groups with O, are preferred. As in the present practice, the organic solvents can most usually be diluted by emulsification in water.

Removal of the protective layer is carried out using the methods now mostly employed, that is in the same or similar way as the methods described for preservation, for example such as dipping or spraying. In this way the objects are freed of the acrylic polymer protective coating with solvents or their emulsions with water as the mobile phase.

A better understanding of the present invention and of its many advantages will be had from the following specific examples, given by way of illustration.

GENERAL INSTRUCTIONS FOR DISPERSION PREPARATION AND EXAMPLE 1

0.54 g of paraffin sulfonate Na salt and 0.216 g of ammonium peroxydisulfate are dissolved in 435 g of deionized water at 20° C. in a 2-liter reaction vessel equipped with reflux condenser, stirrer, and addition vessel.

An emulsion of:
489.6 g 2-ethylhexyl methacrylate
216.0 g 2,3,5-trimethylcyclohexyl methacrylate
14.4 g methacrylic acid
8.1 g of paraffin sulfonate Na salt
7.2 g of 2-ethylhexyl thioglycolate and
670.0 g of deionized water is dosed into this solution with stirring at 80° C. over a period of 4 hours. After end of the addition, the batch is cooled to room temperature and 0.45 g of 1,4-diisopropylbenzene monohydroperoxide and 0.36 g of sodium formaldehyde sulfoxylate are added at 70° C. The dispersion is then filtered. The dry content of the dispersion is about 40 percent by weight.

The properties of the dispersion are reported in the following Table.

Further polymers (cf. Examples 2-7 in the following Table) were prepared in corresponding manner.

Polymer films prepared from the dispersions of Example 1-7 are soluble in n-hexane as a usable organic solvent.

| Example No. | Polymer Composition | MFT[1] (°C.) | pH | Brookfield Viscosity[2] (mPa · s) | Particle Size[3] (nanometers) |
|---|---|---|---|---|---|
| 1 | B - A - E<br>68 30 2 | 16 | 3.5 | 89 | 170 |
| 2 | B - A<br>75 25 | 19 | 3.0 | 170 | 145 |
| 3 | B - D - E<br>49 49 2 | 0 | 3.5 | 35 | 175 |
| 4 | D - B - A - E<br>35 33 30 2 | 0 | 3.5 | 33 | 170 |
| 5 | B - C - E<br>68 30 2 | 7 | 3.8 | 26 | 220 |
| 6 | F - A - E<br>68 30 2 | 0 | 3.4 | 142 | 125 |
| 7 | B - A - G<br>65 30 5 | 16 | 3.0 | 1400 | 380 |

A: 3,3,5-trimethylcyclohexyl methacrylate
B: Ethylhexyl methacrylate
C: Isobutyl methacrylate
D: Ethylhexyl acrylate
E: Methacrylic acid
F: Butyl acrylate
G: Acrylic acid
[1]According to DIN 53 787
[2]According to ISO 2555
[3]Determined with "Nano-Sizer" of Coulter Electronics, Ltd.

What is claimed is:

1. A method for providing temporary protection to the surface of a mechanical object with a coating of an acrylic polymer, which method comprises applying to said object an aqueous dispersion of a lipophilic poly(meth)acrylate polymer and removing water therefrom, whereby a film of said polymer is formed on said object, and, when said protective coating is no longer wanted or needed, removing said film from said object with a combustible organic solvent, and, after removal of said film from said object, completely combusting said organic solvent and the removed polymer dissolved therein to $CO_2$ and $H_2O$.

2. A method for providing temporary protection to the surface of a mechanical object with a coating of an acrylic polymer, which method comprises applying to said object an aqueous dispersion of a lipophilic poly(meth)acrylate polymer and removing water therefrom, whereby a film of said polymer is formed on said object, and, when said protective coating is no longer wanted or needed, removing said film from said object with an aqueous emulsion or a combustible organic solvent.

3. A method as in claim 2 wherein, after removal of said film from said object, said aqueous emulsion or organic solvent is separated into an aqueous phase and an organic phase having removed polymer dissolved therein, and said organic phase and dissolved polymer are then completely combusted to $CO_2$ and $H_2O$.

* * * * *

UNITED STATES PATENT AND TRADEMARK OFFICE
CERTIFICATE OF CORRECTION

PATENT NO.   : 5,061,518
DATED        : October 29, 1991
INVENTOR(S)  : Langerbeins et al.

It is certified that error appears in the above-identified patent and that said Letters Patent is hereby corrected as shown below:

Column 7, lines 2 and 4, in each instance replace "or" by --of--.

Signed and Sealed this

Sixteenth Day of March, 1993

*Attest:*

STEPHEN G. KUNIN

*Attesting Officer*         *Acting Commissioner of Patents and Trademarks*